Dec. 10, 1940.  V. M. PYATT  2,224,798
PRESSURE INDICATING MEANS FOR TIRES
Filed March 24, 1938   2 Sheets-Sheet 1
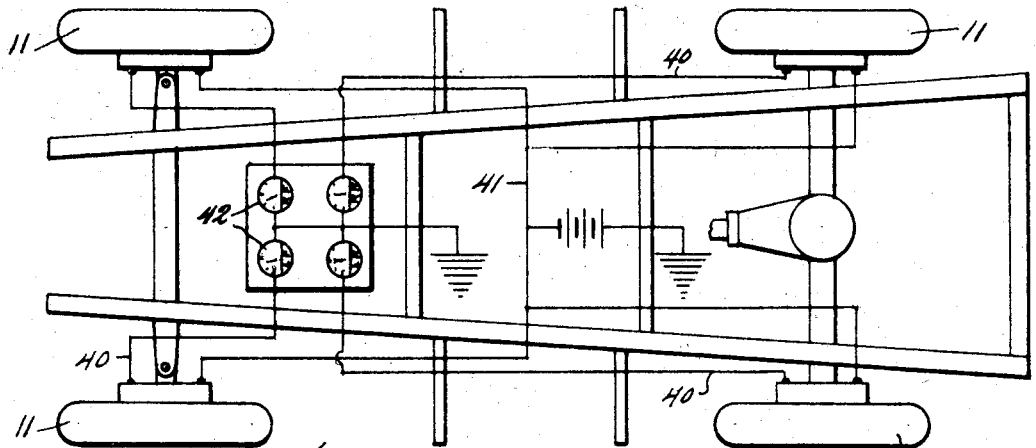
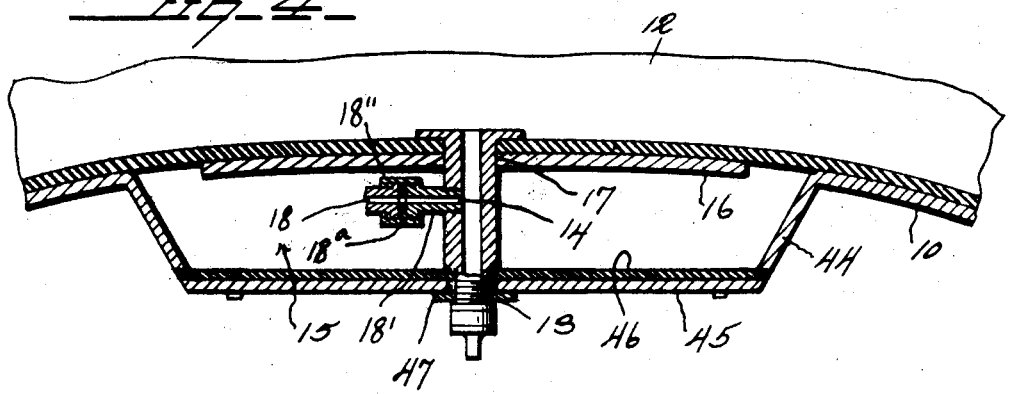
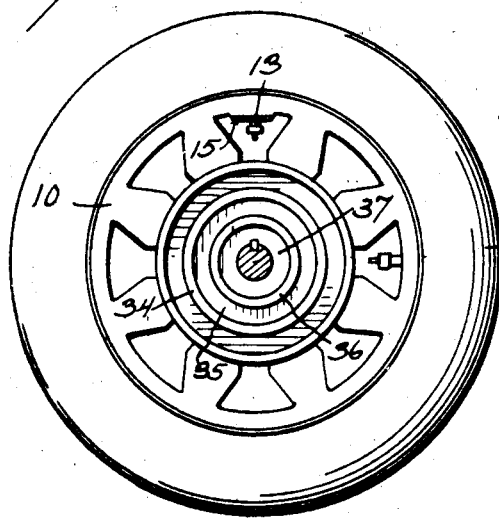
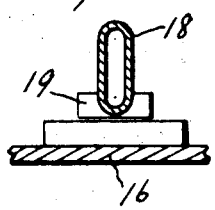
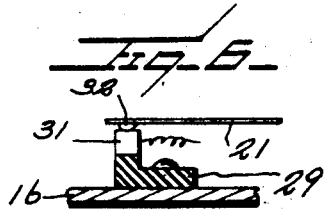
Inventor
V. M. Pyatt
By Watson E. Coleman
Attorney

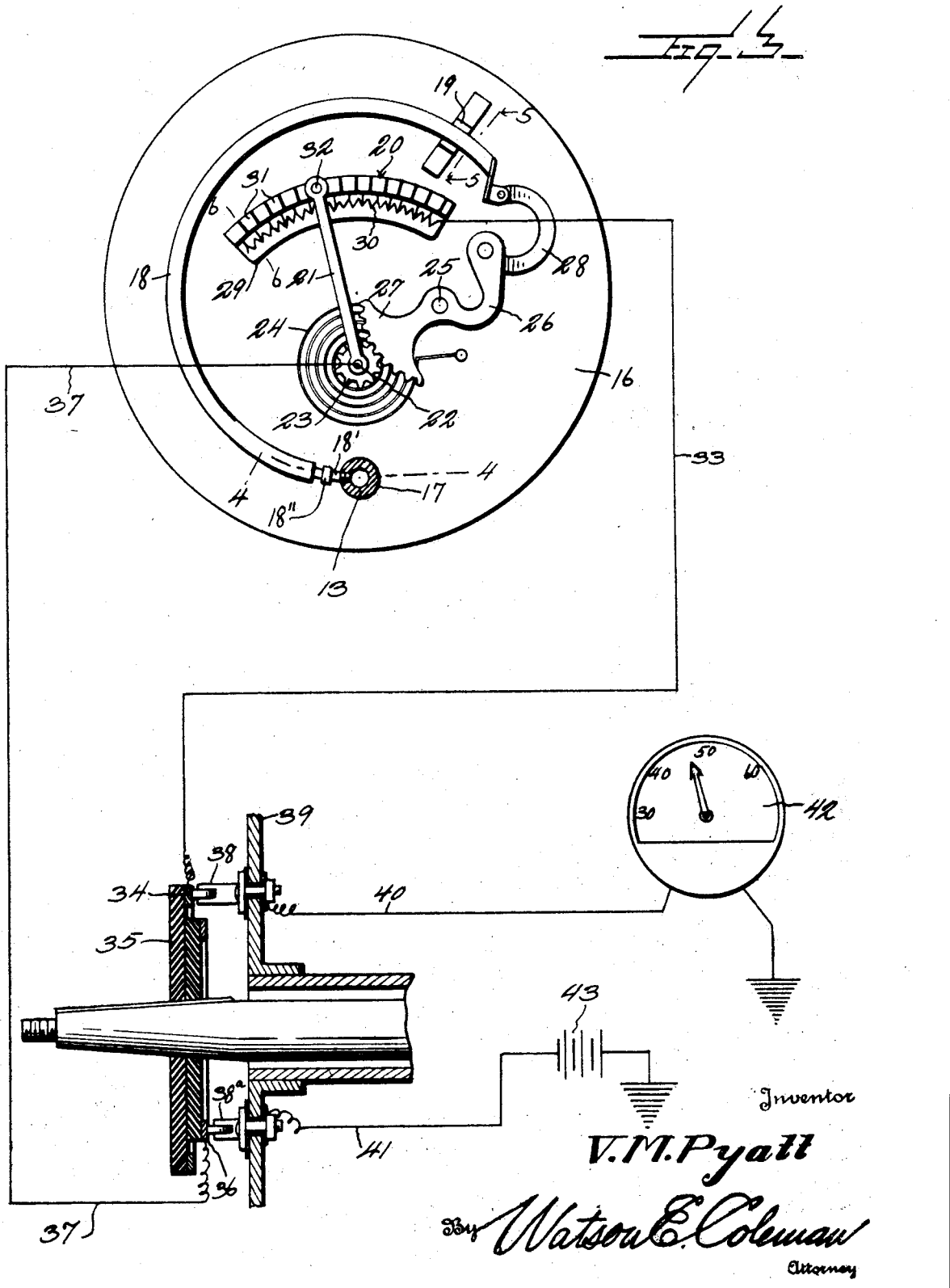

Patented Dec. 10, 1940

2,224,798

UNITED STATES PATENT OFFICE 2,224,798

PRESSURE INDICATING MEANS FOR TIRES

Valdis M. Pyatt, Great Falls, Mont.

Application March 24, 1938, Serial No. 197,939

2 Claims. (Cl. 201—48)

This invention relates to means for indicating the pressure within a tire and particularly to devices for this purpose wherein the pressure controls an indicator mounted on the instrument board of the vehicle or in any other convenient place for observation.

An object of this invention is to provide a simple and yet accurate means for indicating the pressure on each of the tires of an automobile, which means includes a pressure controlled element carried by each wheel and communicating with the inner tube thereof, a rheostat associated with the pressure controlled element and over which moves a contact finger operated by said element, the rheostat in turn controlling an electrically operated indicator connected in circuit with a rheostat and individual to that particular tire and located preferably on the instrument board to thus provide means whereby the driver can see at a glance the pressure carried on any particular tire of his vehicle and thus avoid either dangerous over-pressure, as in hot summer weather, or equally dangerous under-pressure.

Other objects will appear in the course of the following description.

My invention is illustrated in the accompanying drawings wherein:

Fig. 1 is a top plan view of an automotive vehicle showing my invention applied thereto, the figure being largely diagrammatic;

Fig. 2 is a side elevation of an automobile wheel showing my structure applied thereto;

Fig. 3 is a front elevation of the rheostat and controlling means therefor and the support upon which it is mounted, and a sectional view of a wheel, the figure showing diagrammatically the electrical connections to a pressure indicating device;

Fig. 4 is a vertical section on the line 4—4 of Fig. 3, and through the wheel rim and inner tube only those parts of the rheostat actually cut through by the section line being shown;

Fig. 5 is a section on the line 5—5 of Fig. 3;

Fig. 6 is a section on the line 6—6 of Fig. 3.

Referring to these drawings, 10 designates the rim of an automobile wheel, 11 the shoe of the tire and 12 the inner tube thereof. Extending through the rim and engaging with this inner tube is the tire valve 13, which may be either a special valve or the usual inflating valve. As illustrated, this valve 13 is provided with a laterally extending port 14. Surrounding the outer end of the valve 13 and disposed preferably in a recess or chamber 15 in the rim 10, is a base 16 having an opening 17 through which the outer end of the valve 13 projects. Upon this base there is disposed a Bourdon tube 18, one end of the tube communicating with the port 14. The other end of the tube is carried in a guide 19 shown in Fig. 2, which permits the free end of the tube to shift radially outward or inward from the center of the base 16. Disposed within the casing 15 is a rheostat designated generally 20, and operating over the face of the resistance thereof is an arm 21 mounted on the base 16 for oscillating movement at 22 and at this point provided with the gear wheel 23. A spring 24 urges the arm 21 in one direction. Pivoted at 25 upon the base 16 is a lever 26 carrying on it a segment gear 27 which engages with the gear 23. The end of the tube 18 is connected to the adjacent end of the lever 26 by means of a curved link 28 which is operatively pivoted to the end of the tube 18 and to the end of the lever 26. It will be seen that when the tube expands under pressure, the lever 26 will be shifted in one direction, but when the tube 18 contracts, it will be shifted in the other direction. This will shift the free end of the arm 21 over the face of the rheostat 20.

The rheostat 20, as shown in Fig. 3, includes a rubber or hard fibre supporting member 29 upon which is mounted the resistance wire 30, connected at intervals to silver inlays or contact pieces 31, mounted in the hard fibre support. The arm 21 is also provided at its free end with a silver contact member 32 which moves over the faces of the contact pieces 31. The wire 33 is connected to a collector ring 34 of copper, which is mounted upon a disk 35 rotating with the wheel. Also disposed on the disk 35 is an inner collector ring 36 which is of copper and insulated from the ring 34. The wire 33 from one end of the rheostat is connected to the ring 34 while a wire 37 from the ring 36 is electrically connected by any suitable means to the arm 21. Associated with the ring 34 is a trolley wheel 38 constituting a brush and carried by the brake drum housing 39. This trolley wheel or brush is connected by a wire 40 to an indicating member on the dashboard, while the brush 38ª associated with ring 36 is connected by a wire 41 to a ground. The wire 40 extends to an ammeter or other electrical measuring instrument 42 on the dashboard or instrument board, this particular measuring instrument being individual to the particular tire electrically connected therewith. The ammeter 42 is connected in turn to the ground. A battery or other source of potential 43 is connected in a circuit which includes the ammeter or other measuring instrument and the rheostat.

It will be obvious now that as the pressure increases within the inner tube of the tire, the arm 21 will move over the rheostat and cut out resistance which will cause the movement of the hand on the ammeter, the ammeter having indications thereon showing pounds of pressure. As the pressure reduces the inner tire, the arm 21 will move in the opposite direction under the action of the spring 24 and contacting tube 18 and resistance will be cut in and the hand on the ammeter will show this reduction in pressure. It is to be understood that there are as many of these indicators 42 as there are tires and that each indicator will show the pressure in a particular tire.

It will be noted that the base 16 is located on the valve stem very closely adjacent the inner tube or as close to the inner tube as possible, and that this is particularly important due to centrifugal force. Thus the Bourdon tube with its associated parts will be submitted to almost exactly the same action as the inner tube itself and thus will accurately register the variation in pressure in the inner tube. This pressure-operated mechanism is contained within the housing, and being located within the recess in the rim of the tire, it cannot be damaged by mud, rocks or the like. Preferably the contact point or element 32 and the contact pieces 31 of the rheostat are of silver so that a thoroughly good contact may be made between these highly conductive elements. The faces of the copper rings 34 and 36 may also be plated with silver if desired, and the peripheries of the contact trolleys or wheels 35 might also be of silver, thus insuring a first-class electrical contact.

It is to be understood that in case of dual tires, an indicator operating mechanism such as shown in Fig. 3 will go on each tire. A single collector ring may be used for the ground connection, but a second collector ring 34 must be used for each tire. It is to be understood that the base 16 is to be so disposed that the arm 21 moves transversely of the plane of the wheel so that the centrifugal force will only tend to make a greater contact pressure between the contact member 32 and the faces of the rheostat elements. The Bourdon tube will be preferably made of brass so that it will not become porous and will last indefinitely. The rheostat contact members being of silver with mica insulation between each contact, a smooth and even surface is provided which insures a good contact and easy operation.

In the preferred construction and arrangements of the parts, the Bourdon tube and the rheostat and their concomitant parts, are all enclosed within a casing 44 which may be attached to the rim 10 of the wheel or formed integrally therewith on wheels that are built for the invention as illustrated in Figs. 2 and 4. In either event the casing 44 is water and dust-proof and is provided with a lid 45 secured to the body portion of the casing by detachable fastening devices of any desired character, a packing or gasket plate or disk 46 being provided back of the lid or cover 45 so as to make the device water and dust-proof as above mentioned. The cover plate 45 is manifestly formed with an opening in it for the air valve to pass thru as best illustrated in Fig. 4, and preferably I provide a nut 47 to draw the shoulders of the air valve tight against the cover plate.

Preferably also the Bourdon tube 18 is connected to the air valve 13 at the port 14 thereof by means of a nipple 18', a coupling sleeve 18", and an intermediate perforated gasket 18a. This permits the parts to be readily disassembled as it is only necessary to unfasten and remove the cover plate 45 and the packing disk 46 to obtain access to the Bourdon tube and its detachable connection with the air valve 13.

While I have illustrated what I believe to be a particularly practical form of my invention, I do not wish to be limited to the details of construction as these might be varied in many ways without departing from the spirit of the invention as defined in the appended claims.

What is claimed is:

1. In an electric circuit controlling mechanism of the character stated, the combination with a metallic wheel rim and a pneumatic tire thereon including an inner tube, of a casing carried by the rim between the periphery and the radial center thereof and having radially spaced inner and outer sides, the inner side of the casing forming a removable cover, a Bourdon tube mounted within the casing, means for communicatively connecting an end of the Bourdon tube with the interior of the inner tube within the tire, a rheostat within the casing and including a conductive arm and a resistance over which an end of the arm moves, said resistance being supported upon the outer side of the casing, means pivotally supporting the arm at its other end for oscillation on an axis extending substantially radially of the wheel, and means operatively connecting the free end of the Bourdon tube with the arm for causing the oscillation of the arm as the Bourdon tube expands and contracts, the arm lying between the resistance and the inner side of the casing whereby it will be urged more firmly into contact with the resistance by centrifugal action upon rotation of the wheel.

2. In an electric circuit controlling mechanism of the character stated, the combination with a metallic wheel rim and a pneumatic tire thereon, including an inner tube, of a casing including a radially impressed portion of the rim and disposed between the periphery of the rim and the radial center and having radially spaced inner and outer sides, the said inner side of the casing forming a removable cover, a Bourdon tube mounted within the casing, the said inner tube having an air valve tube extending therefrom through the casing and through the inner and outer sides thereof, a connection between an end of the Bourdon tube and said valve tube by which communication is established between the Bourdon tube and the interior of the tire inner tube, a rheostat housed within the casing and including a conductive arm and a resistance over which an end of the arm moves, said resistance being supported in the casing at the outer side thereof, means pivotally supporting the arm at its other end for oscillation upon an axis extending substantially radially of the wheel, and means operatively coupling the free end of the Bourdon tube with the arm for causing the oscillation of the arm on said axis as the Bourdon tube expands and contracts, the arm being disposed between the resistance and the inner side of the casing whereby it will be urged more firmly into contact with the resistance by centrifugal action upon rotation of the wheel.

VALDIS M. PYATT.